Oct. 13, 1964     A. L. REDIGER     3,152,629
APPARATUS AND METHOD FOR HELICALLY WINDING STRIP MATERIAL
Filed May 9, 1961     3 Sheets-Sheet 1

Inventor:
Alvin L. Rediger,
by John M. Stoudt
Attorney.

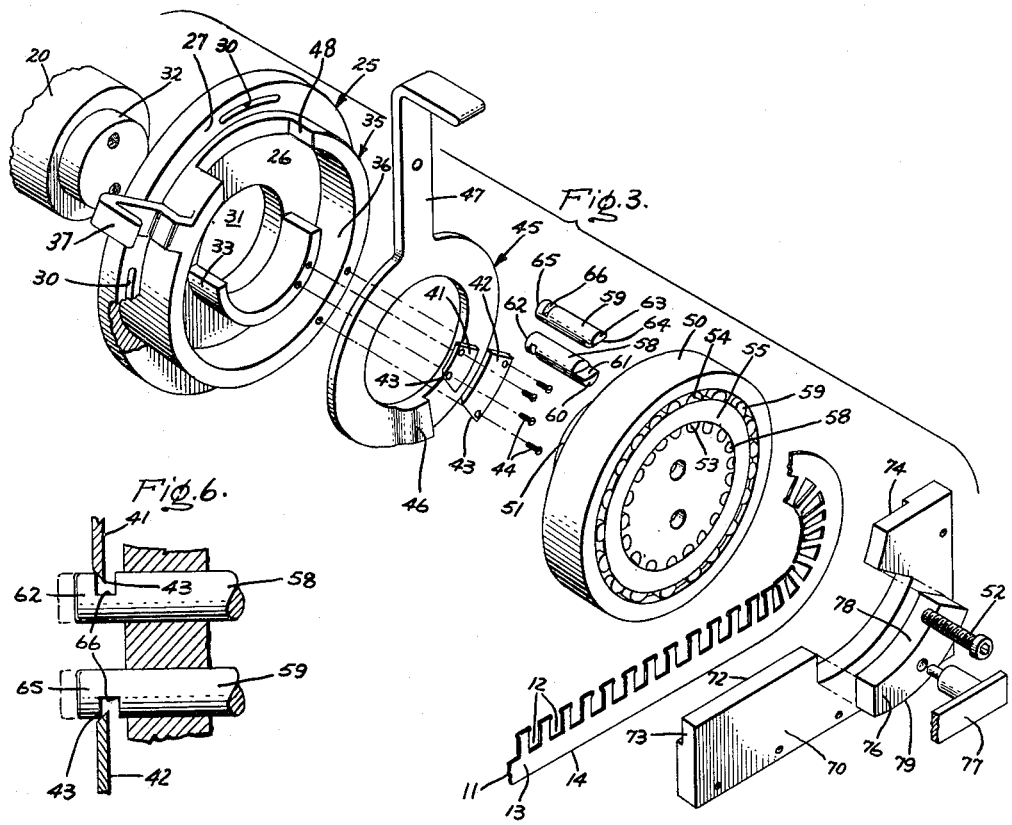
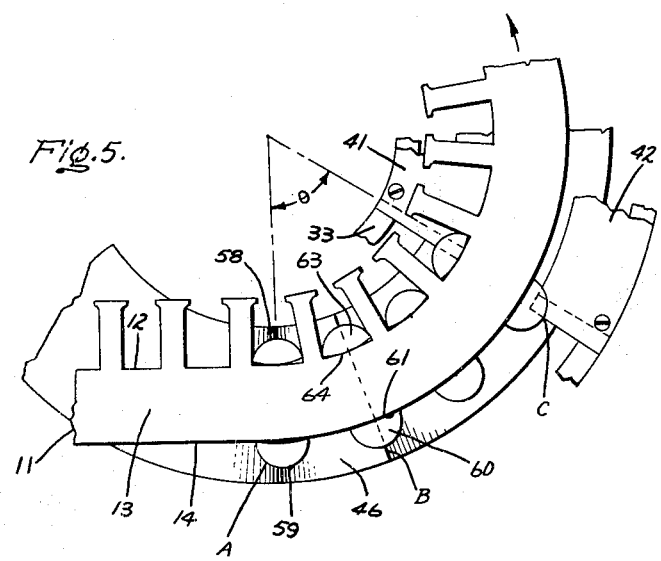

Oct. 13, 1964　　　A. L. REDIGER　　　3,152,629
APPARATUS AND METHOD FOR HELICALLY WINDING STRIP MATERIAL
Filed May 9, 1961　　　　　　　　　　　3 Sheets-Sheet 3

Inventor:
Alvin L. Rediger,
by John M. Stoudt
Attorney.

3,152,629
APPARATUS AND METHOD FOR HELICALLY WINDING STRIP MATERIAL
Alvin L. Rediger, Holland, Mich., assignor to General Electric Company, a corporation of New York
Filed May 9, 1961, Ser. No. 108,867
11 Claims. (Cl. 153—64.5)

This invention relates generally to an apparatus and method for helically winding elongated strip material, and more particularly to an improved apparatus and method for forming a continuous relatively thin perforated metal strip into an edge-wound helix, suitable for use as a core structure in the construction of electric motors.

Dynamoelectric machines, especially small horsepower induction electric motors, conventionally incorporate rotor and stator cores formed of a plurality of individual generally disc-shaped laminations. In the manufacture of these cores, it is common practice to stamp out the laminations from relatively thin magnetic sheet material, such as for example, the well-known semi-processed or mill annealed electrical silicon sheet steels having thicknesses in the order of 0.010 to 0.030 inch. With specific reference to the formation of stator laminations, customarily, the punching operation produces a lamination of annular configuration provided with a suitable rotor receiving bore and spaced apart slots in communication with the bore. A predetermined number of laminations are then stacked in juxtaposed relation to form a stack with aligned slots for accommodating an electrical winding and the stack is placed under compression while some form of fastening means, e.g. transverse welds across the periphery of the stack, is utilized to secure the laminations together into a unitary core structure. Although the electrical characteristics of this type of core are highly desirable, the fabrication process entails an excessive waste of magnetic material, especially between adjacent laminations, resulting in relatively high manufacturing costs.

Thus, in an effort to reduce the waste of material and ultimate cost of producing stator cores, it has been suggested that the cores be constructed from a continuous strip of material which is initially perforated at equal intervals on one edge of the strip to provide the requisite winding slots. The strip is then edge wound into a cylindrical helix with the slots axially aligned to provide a complete stator structure from a single strip of material. However, prior to the present invention, the methods proposed to manufacture edge wound stator cores and the suggested apparatus have limited the quality of the resulting helically wound core. For instance, in one approach, a continuous length of strip material having a plurality of slots provided on its edge is fed between a pair of tapered rollers which exert pressure on the solid portion of the strip, stretching its periphery and giving it an arcuate form. The method and apparatus as disclosed in the Carlson Patent No. 1,920,154 and in the Carpenter et al. Patent No. 2,845,555 are typical of this procedure. Unfortunately, cores manufactured in this manner have not been too satisfactory. For instance, the pressures exerted by the rollers are not always sufficiently uniform, but in addition, the type of bending involved, while shaping the material into a helical form, stretches the material irregularly in response to the pressure applied to produce a helix having an irregular or wavy surface and non-uniform thickness. This, of course adversely affects the electrical characteristics of the core and ultimate performance of the motor. Further, quite frequently the strip is wound such that the slots of the material are misaligned and the core is unsuitable for use as a stator.

In an effort to overcome these objections, especially in the use of a high grade of hardened magnetic material which resists bending, such as mill annealed electrical silicon steel, the material was further annealed to obtain the lowest possible yield point prior to the winding process. However, with this additional annealing step, the material becomes exceedingly sensitive to any bending operation or applied pressure and the strip may still be stretched in an irregular fashion with the resulting undesirable effects as that mentioned heretofore for cores wound with mill annealed material.

Consequently, in spite of the obvious savings in material effected in the forming of cores by the edgewise winding manufacturing techniques; e.g. as high as 25% compared to the processes which produce individual laminations in the manner discussed above for the reasons outlined above, edgewise winding has not been extensively employed by motor manufacturers who still prefer to form stator cores from a plurality of juxtaposed laminations. This is especially true for those situations which require the use of a core having excellent electrical characteristics and formed of silicon steels.

Accordingly, it is the primary object of the present invention to provide an improved method and apparatus for helically winding a strip of material.

It is another object of the invention to provide an improved method and apparatus for winding strip material into a helix while maintaining the thickness of the strip substantially uniform and the face of the material substantially regular.

It is a further object of the invention to provide an improved method and apparatus for winding metallic strip material into a helix without setting up objectionable stresses or material deformations therein.

It is yet another object of the invention to provide an improved method and apparatus for bending a length of strip material having uniformly spaced apart slots on at least one of its edges into a helix, especially suitable for use as a stator core, which is approximately equivalent in performance and electrical characteristics to a stator core formed from a predetermined number of individual laminations having the same composition, comparable contour, and over-all size.

It is still a further object to provide an improved method and apparatus for forming a mill annealed or semi-processed strip of magnetic material into a helix which does not require further annealing or heat treating of the material, before formation of the helix, and yet does not introduce objectionable stresses and material deformations into the formed helix.

In carrying out the objects of this invention in one form thereof, I provide an improved method of forming a compact helix from an elongated relatively thin strip of metallic material having slots adjacent one edge of the strip. Initially a first series of angularly movable members are placed into the strip slots and a second series of members, arranged radially beyond the first series, are urged into engagement with the other edge of the strip. The strip is driven in an arcuate path defined by the angular movement of the members while the members form the strip into a helix, the strip and members being moved as a unit. After a predetermined arcuate travel, each series of members are removed from engagement with the shaped strip whereby, due to the bending action and type of cooperation of the two series of members with the strip, it attains a helical shape of relatively uniform thickness and is wound into a compact helix without introducing objectionable stresses or material deformations therein.

By a further aspect of the invention, I provide an improved apparatus particularly adapted to carry forth the above method. In the preferred embodiment, this apparatus includes a rotatable head having a working face and carrying a plurality of reciprocably movable inner and outer pins, preferably arranged in two concentric circles and designed to rotate with the head as a unit. the inner pins are adapted to engage the edges of the strip slots while the outer pins, disposed radially beyond the inner pins, are adapted to engage the other edge of the strip. Means is provided to reciprocate each pin from a retracted to an extended position with the pins projecting axially beyond the working face of the head while being rotated through a predetermined arcuate path in their respective extended positions. Further, the apparatus includes means for maintaining the strip tightly against the working face during this arcuate travel. The inner and outer pins, when in their extended position, bend the material into an arcuate shape with an exceedingly small bending moment.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings.

In the drawings:

FIG. 3 is an exploded view in perspective of the principal component parts of the apparatus of FIG. 1;

FIG. 5 is a fragmentary view of the preferred manner in which the slotted strip of material is driven and formed into a helix by the apparatus of FIG. 1; and FIG. 6 is a partial view in section of inner and outer pins being returned respectively to their retracted positions.

Figures 1, 2:
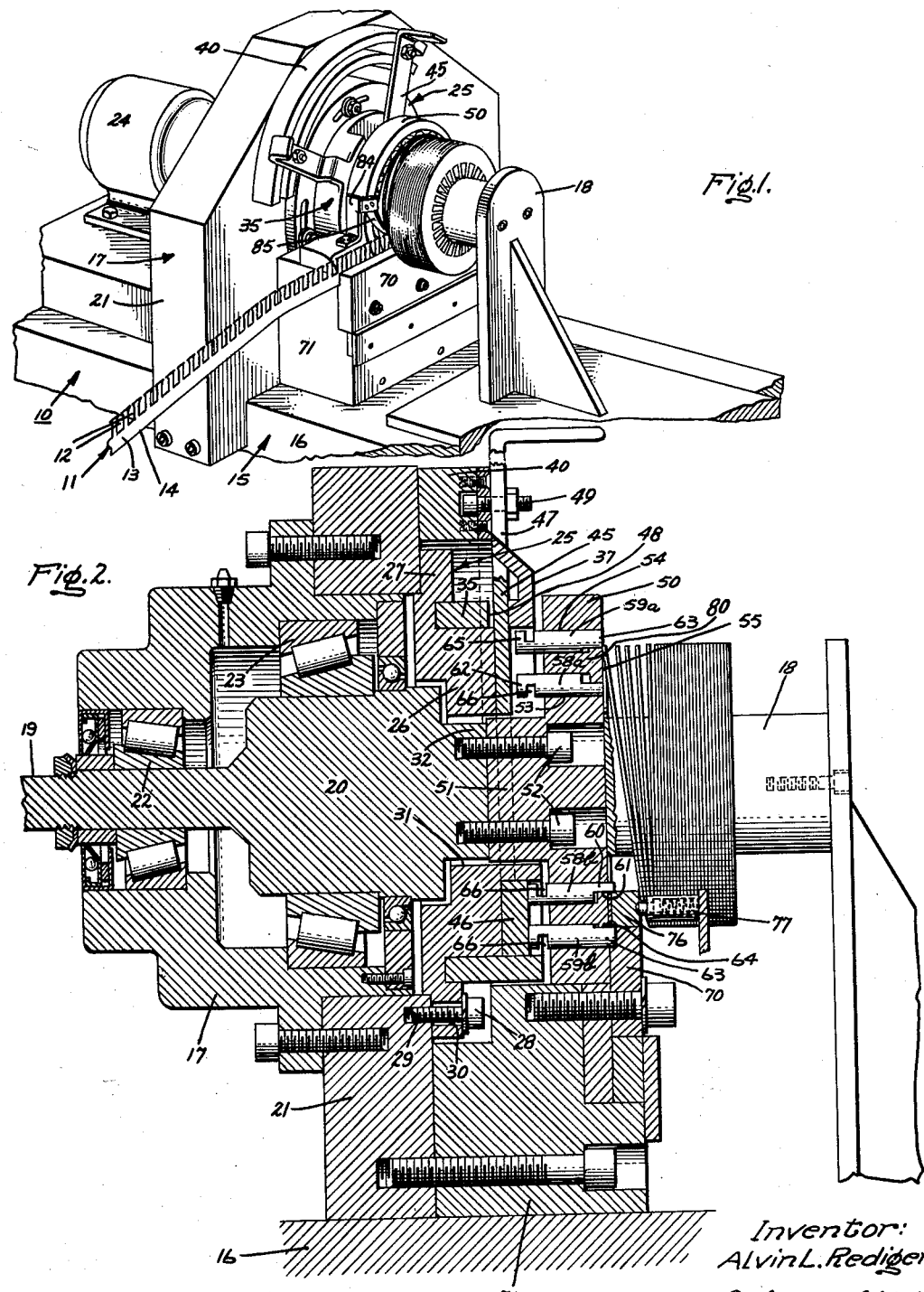
FIG. 1 is a view in perspective of the preferred embodiment of an improved helical winding apparatus incorporating one form of my invention.
FIG. 2 is a view in section of a part of the apparatus of FIG. 1 to illustrate detail.

Referring to the drawings in more detail, for purposes of illustration I have shown the preferred embodiment of my invention employed in connection with a motor stator forming apparatus, generally indicated by numeral 10. In this exemplification, apparatus 10 is used to helically wind or edge wind a stator member from a long continuous strip 11, composed of magnetic material of uniform thickness such as semi-processed silicon steel. The continuous strip comprises a plurality of equally spaced apart rectangular transverse winding accommodating slots 12, which may be punched out of the material by any conventional stamping operation, and a solid portion 13 having an imperforate and straight edge 14.

With specific attention to FIGS. 1 and 2, the illustrated apparatus 10 includes a stationary frame 15 having a horizontal platform 16 for supporting a headstock 17 and an axially shiftable mandrel 18 adapted to carry strip 11 after it has been helically wound. As seen in FIG. 2, a shaft 19, provided with an enlarged end portion 20 projecting axially through and beyond a vertical wall 21 of headstock 17, is rotatably supported by a pair of roller bearings 22 and 23 which are mounted within headstock 17. Any well-known motive power means, such as an electric motor 24 may be employed to drive shaft 19.

As better seen in FIGS. 2 and 3, a generally circular member 25 having an inner section 26 and an outer flanged section 27, is adjustably secured to headstock wall 21. A plurality of bolts 28 cooperate with threaded holes 29 in wall 21 and extend through elongated arcuate-shaped slots 30 arranged at angularly spaced apart locations in flanged section 27 for that purpose. Inner section 26 is provided with a central circular opening 31, somewhat larger in diameter than the extreme end or an extension 32 of shaft 19, for receiving the extension in spaced relation, and with an axially projecting curved portion 33 to be referred to in more detail hereinafter.

An annular member 35 surrounds section 26 of member 25 and has a portion 36 concentric to and coexistensive in length with curved portion 33 of section 26. Preferably annular member 35 is angularly movable relative to member 25 and is adjustably attached to headstock 17. This may be conveniently done by an arrangement in which an arm 37 of member 35, projecting radially beyond member 25, has a nut and bolt 38 cooperating with a curved block structure mounted on wall 21 and formed with an arcuate lipped groove, denoted by character 40.

With specific reference to FIG. 3, relatively thin curved plates 41 and 42, each having a wedge shaped leading edge 43, are mounted on portions 33 and 36 respectively by suitable screws 44 such that the plates project toward each other a predetermined distance. The function of these plates will be subsequently explained.

Referring once again to both FIGS. 2 and 3, a ring-like plate 45 is disposed in abutting relation with section 26 of member 25 between portions 33 and 36 of the respective members and is angularly movable with respect to plates 41 and 42. Ring-like plate 45 has a raised cam surface 46 extending away from member 25 and a radial arm 47 projecting through a slot 48 provided in portion 36 of member 35, the arm being adjustably secured to the curved block and lipped groove structure 40 by bolt 49. Thus, it will be observed that with the foregoing construction, plates 41 and 42 and raised cam surface 46 are adjustable relative to each other; the significance of this arrangement will become more apparent as the description proceeds.

The illustrated mechanism which drives continuous strip 11 and forms it into a helically wound core, preferably includes a cylindrical head 50 having a central shank 51 extending into opening 31 of annular member 25 and attached by bolts 52 to extension 32 for rotation with shaft 19. From FIGS. 2 and 3, it will be seen that radially beyond shank 51, head 50 is furnished with a plurality of angularly spaced apart holes 53 arranged in a circle and a plurality of holes 54 disposed concentrically outwardly from and preferably in radial alignment with holes 53. These holes extend entirely through head 50 and communicate with exposed relatively flat working face 55 of the head, which is arranged substantially perpendicular to the axis of rotation of head 50.

Driving and forming pins 58 and 59 are accommodated in the inner and outer holes respectively, and are reciprocably movable relative to head 50 between a retracted position (pins 58a and 59a in FIG. 2) and an extended position (pins 58b and 59b in FIG. 2). Pins 58 each comprise a forward end 60, having a recessed slightly convex surface 61 designed to engage slots 12 of strip 11, and an end 62 adapted to ride on cam surface 46 which functions to move pins 58 from the retracted to the extended positions. Referring to pins 59, each includes a forward end 63 with a slightly concave recessed surface 64 for engagement with edge 14 of strip 11 and end 65 designed to ride on cam surface 46 for the same reason as that given above for end 62 of pin 58. Pin ends 62 and 65 are each provided with a groove 66 designed to cooperate with plates 41 and 42 respectively for returning pins 58 and 59 to their retracted positions in a manner to be explained below.

Apparatus 10 incorporates means for guiding and urging strip 11 into firm or compressive engagement with rotatable working face 55 of head 50 and with pins 58 and 59 while the strip is being bent and formed. As illustrated in FIGS. 1, 2 and 3, a guide plate 70 is retained adjacent face 55 by any suitable arrangement, such as being mounted onto a stationary base 71 which is positioned on platform 16 and secured to wall 21. Plate 70 (see FIG. 3 in particular) is formed on its uppermost edge with a strip receiving channel 72 having a straight configuration at its entrance 73 and having a curved exit 74, generally conforming in shape to the helix of the formed strip. Intermediate entrance 73 and exit 74, channel 72 is cut out to accommodate a curved shoe 76, biased by any suitable means, such as a spring and plunger assembly 77, into frictional contact with solid portion 13 of strip 11 as it is being helically wound. Preferably, curved shoe 76 has a radial width between its curved side surfaces 78, 79, slightly less than the radial distance between driving and forming surfaces 61 and 64 of pins 58 and 59, and has a flat hard surface disposed toward and substantially parallel with working face 55 of the rotatable head 50.

Figure 4:
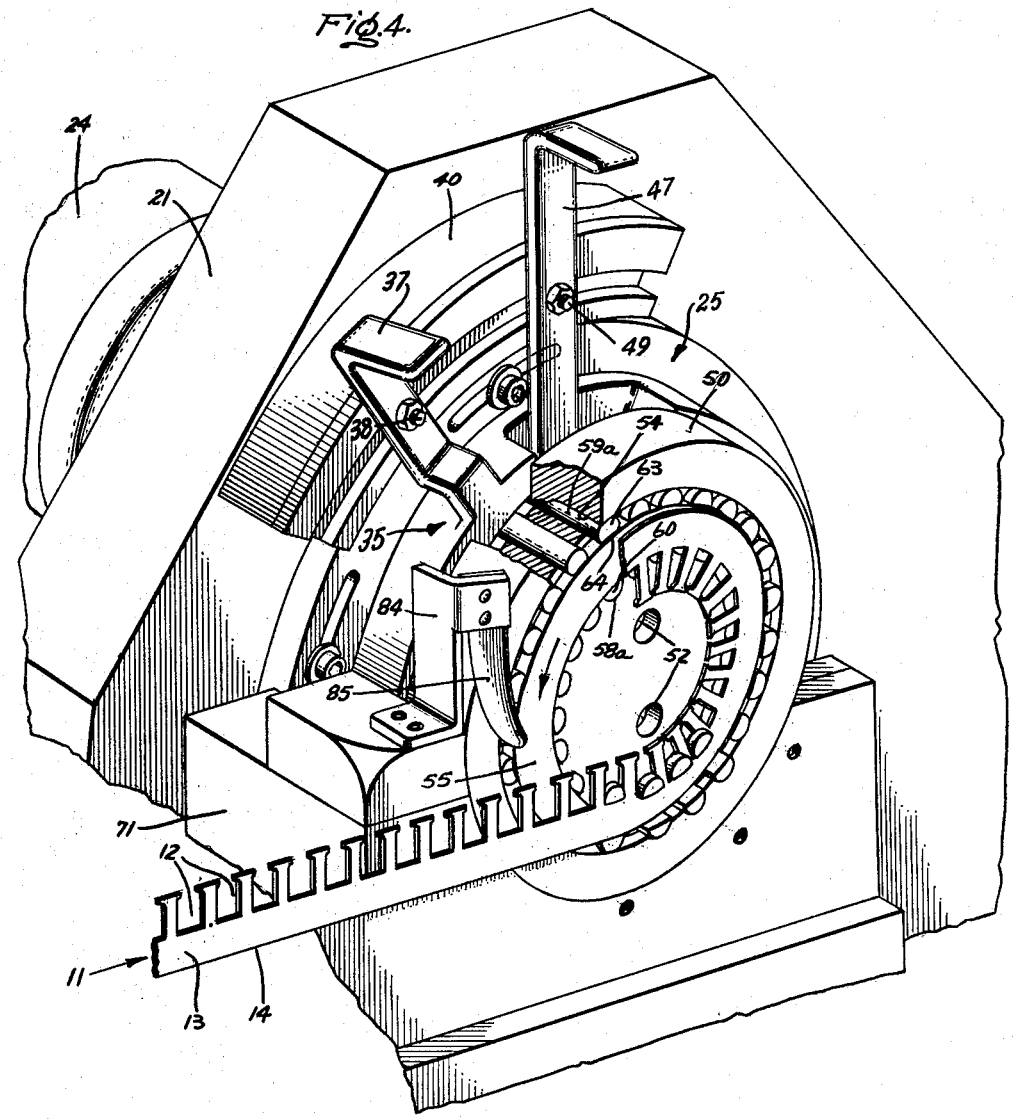
FIG. 4 is an enlarged view in perspective, partially broken away, of a part of the apparatus of FIG. 1 to show forming pins driving and bending a strip of magnetic material slotted on one edge.

The operation of apparatus 10 will now be considered and the features and advantages of the present invention will become more apparent. A continuous length of semi-processed or mill annealed strip 11 is fed into entrance 73 of channel 72 with strip slots 13 facing upwardly toward pins 58 (FIG. 3) and edge 14 being disposed toward outer pins 59. Assuming head 50 and consequently pins 58 and 59 are rotated counterclockwise in the direction of the arrows in FIGS. 3, 4 and 5, ends 62 and 65 of the pins are driven into engagement with the incline of raised cam surface 46 which simultaneously imparts reciprocating motion to pins 58 and 59 at position A shown in FIG. 5. That is to say, cam surface 46 moves the pair of pins at A from a retracted position to an extended position in which the forward ends 60 and 63 of the pins are moved axially beyond face 55. This position is slightly exaggerated in the drawings since in actual practice it is necessary to have the pins exposed only a fraction of an inch; e.g., 0.030 inch, when forming strips having a thickness in the range of 0.014 to 0.025 inch. Consequently, the extreme forward end of inner pin 58 enters and engages the edge of strip slot 12 while end 65 of outer pin 59 firmly engages strip edge 14. If desired, holes 53 and 54 in head 50 may each be furnished with a shoulder 80 (FIG. 2) for engaging the bottom of recessed pin surfaces 61 and 64 to provide a positive means for limiting the movement of pin surfaces 61 and 64 to their extended positions previously defined (toward the right in the drawings).

As the inner and outer pins 58 and 59 are moved in an arcuate path by rotating head 50, successive pins will come into contact with cam surface 46 and will be urged into driving engagement with strip 11 at position A (FIG. 5) for an arcuate path of angle $\theta$, preferably not more than 50°. If either of the pins 58 and 59 were permitted to remain in contact with the strip for a greater arcuate length of travel, the width of slots 12 would become progressively restricted in size, and would ultimately interlock with pins 58, causing interference with the winding of the material. It should be observed at this time that for the arcuate travel $\theta$, there is an extended pin 59 in tight engagement with strip edge 14, disposed a short distance outwardly from each inner pin 58 (i.e., the width of portion 13 of strip 11), the strip and pins in effect moving together as a unit. Thus, each pair of inner and outer pins together provide an exceedingly small bending moment on the material and the strip is subjected to unusually low bending stresses. Concurrent with the movement of strip 11 through angle $\theta$, preferably curved shoe 76 is urged against the outer side surface of the strip for substantially the arcuate length defined by angle $\theta$ to apply a restraining force of sufficient magnitude on the sides of strip portion 13, between working face 55 and shoe 76, to prevent lateral buckling of the material and assist material flow radially toward outer pins 59 where the strip has a slight tendency to stretch and diminish in thickness during the winding operation.

Consequently, even for strip material composed of relatively hard silicon steel, that has not been specially annealed or otherwise treated preparatory to the bending operation and has rectangular shaped slots having corners particularly susceptible of being cracked and adversely affected, in view of the interaction of pins 58, 59 and shoe 76 with working face 55, the material is formed into a compact helix of substantially uniform thickness without introducing objectionable material deformations and stresses.

It should be observed at this point that even though extended pins 58 and 59 are driven beyond the end of the raised cam surface 46, the position denoted by the letter B, due to the frictional and firm engagement of the pins with strip 11, the pins will be maintained in their extended positions. This is accomplished at position C, where the pins 58 and 59 are independently retracted by plates 41 and 42 respectively.

The precise manner in which the plates cooperate with the pins to effect the return is clearly illustrated by FIG. 6. Taking inner pin 58, for example, in its extended position, as shown in solid, pin groove 66 is toward the right of plate 41. As the pin approaches the plate, the wedge shaped leading plate edge 43 enters the groove, forcing the pin away from face 55 of head 50 and into its retracted position, which the pin will maintain until it is once again pushed forward at position A by cam surface 46. In a like fashion, plate 42 cooperates with groove 66 in outer pin 59 to move it to the retracted position.

As previously mentioned, plates 41 and 42 and cam surface 46 are each independently adjustable. Thus, the point at which the pins are displaced from the retracted to the extended positions relative to the entrance 73 of channel 72 is readily controlled, and angle $\theta$, the arcuate length of engagement of the pins with the material, for each set of pins 58 and 59, can also accurately be regulated. In this way, the differences between strips 11 being formed may be taken into consideration and compensated for; that is, differences in material composition, hardness, thickness, and mill process variables, among others.

Once the strip has been bent and formed into the proper arcuate shape, it is rotated into contact with a structure 84 having a blade 85 disposed adjacent head face 55 mounted on base 71 for guiding the wound strip away from head 50 and onto mandrel 18. If desired, a suitable spline arrangement (not shown) may be incorporated on the mandrel to align the slots in the strip. Finally, after the proper amount of material has been formed into a helix, the strip may be cut by any suitable means; e.g. shears, compressed axially by a pressure of approximately sixty tons to compact the helix, and the wound helix secured into a unitary structure as by welding the helix transversely across its peripheral surface.

In actual practice, the method and apparatus of the present invention, as outlined above, were employed to helically wind twenty-four square slotted cylindrical stator cores of the 20 frame size from a variety of semi-processed material; e.g., high grade mill annealed armature silicon steel and low grade common iron. These cores were electrically tested and compared with standard stator cores of equivalent size and over-all configuration, fabricated from a plurality of stamped out laminations of the same material. Both kinds of stator cores, i.e., helically wound produced by the present invention and the standard laminated type, included identical winding arrangements and had the following dimensions:

| | Inches |
|---|---|
| Outer peripheral core diameter | 4.8 |
| Rotor receiving bore diameter | 2.4 |
| Stack length | 1.4 |

The following table is a partial tabulation of this comparison:

| | 0.025″ Armature Grade Silicon Steel Stock | | 0.0195″ Common Iron Stock |
|---|---|---|---|
| | Standard Core | Helically Wound Core | Helically Wound Core |
| Full Load Efficiency, percent | 67.5 | 67.6 | 67.4 |
| Full Load, r.p.m. | 3,490 | 3,486 | 3,486 |
| Full Load, Amps | 3.75 | 3.65 | 3.74 |
| Full Load in Watts | 279 | 277 | 279.4 |
| Core Density in Percent | 96 | 95 | 95 |

Thus, it will be appreciated from the above table that cores helically wound by the present invention compare favorably with standard laminated stator cores of equivalent size, and this is the case even though common iron and mill-annealed silicon steel are utilized without any additional stress relieving or special annealing operation being performed on the material prior to the helically forming operation.

While I have shown and described specific embodiments of the present invention, if is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

1. A method for forming a helix from an elongated relatively thin strip of material having spaced apart slots adjacent at least one edge thereof comprising placing a first series of angularly movable members into the slots and a second series of angularly movable members into engagement with the other edge of the strip, driving the strip in an arcuate path defined by the angular movement of the members thereby forming the strip into a helix, and removing each series of members from engagement with the formed strip whereby the strip attains a helical form without setting up objectionable stresses in the helix.

2. A method for forming a helically wound member from an elongated relatively thin metal strip of material having spaced apart slots in communication with one edge thereof comprising placing a first series of successively movable pins into said slots and a second series of angularly movable pins, concentrically arranged with respect to said first series, into engagement with the other edge of the strip radially beyond the first series; simultaneously moving the first and second series of pins in concentric arcuate paths to drive the strip in an arcuate path and to bend the strip by the firm engagement between the pins and the strip; and removing each series of pins from engagement with the formed strip whereby the strip attains a helical shape without introducing objectionable stresses therein.

3. A method for forming a compact helically wound stator core from an elongated relatively thin metal strip of magnetic material having spaced apart slots in communication with one edge thereof comprising placing a first series of successively movable pins into said slots and a second series of angularly movable pins concentrically arranged with respect to said first series, into engagement with the other edge of the strip radially beyond the first series; simultaneously moving the first and second series of pins in concentric arcuate paths to drive the strip in an arcuate path and to bend the strip by the firm engagement of the pins therewith; maintaining the strip between the pins for a portion of the arcuate path thereby bending at least the strip between the two series of pins; and removing each series of pins from engagement with the formed strip whereby the strip attains a helical shape having a substantially uniform thickness without introducing objectionable stresses and deformations in the helix.

4. A method for forming a helix from an elongated relatively thin strip of material, comprising placing a first series of angularly movable members into engagement with one edge of said strip and an angularly movable second series of members into engagement with the other edge of the strip, moving said series of members together and driving the strip in an arcuate path defined by the concurrent angular movement of the members thereby forming the strip into a helix, and removing each series of members from engagement with the formed strip whereby the strip attains a helical form without setting up objectionable stresses in the helix.

5. In an apparatus for forming a helix from an elongated relatively thin strip of material having spaced apart slots adjacent one edge thereof, driving means having a working face and carrying a plurality of spaced apart inner and outer forming members, said driving means and said forming members being arranged to move together with said members traveling in concentric arcuate paths, means for moving each of said forming members from a retracted position to an extended position for a portion of said paths, with said forming members projecting beyond said working face into firm engagement with the strip when in said extended position, thereby to drive the strip in an arcuate path and form said strip into a helix without introducing objectionable stresses therein.

6. In an apparatus for forming a helix from an elongated relatively thin strip of material having spaced apart slots adjacent one edge thereof, rotatable means having a working face and carrying a plurality of spaced apart reciprocable inner and outer forming members with the outer members disposed radially beyond said inner members by a predetermined distance, said rotatable driving and said forming members arranged to move together with said members traveling in concentric arcuate paths, means for reciprocating each of said forming members from a retracted position to an extended position for a portion of said paths, means for returning said members from the extended position to a retracted position, a portion of said members projecting beyond said working face into firm engagement with the strip when in said extended position thereby to drive the strip in an arcuate path and form said strip into a helix without introducing objectionable stresses and deformations therein.

7. In an apparatus for forming a helix from an elongated relatively thin strip of metallic material having equally spaced apart slots adjacent one edge thereof and a solid portion, a rotatable head having a working face and carrying a plurality of spaced apart forming pins arranged in concentric inner and outer circles with the pins of the outer circle disposed radially beyond said inner pins by a distance corresponding to the width of the solid portion of the strip, said pins being independently movable in an axial direction relative to said working face, means for moving each of said pins from a retracted position to an extended position as said head and forming pins rotate together as a unit, whereby a portion of said pins project beyond said working face into firm engagement with the strip thereby to drive the strip in an arcuate path and form the strip into a helix without introducing objectionable stresses and deformations therein.

8. In an apparatus for forming a helically wound stator core from an elongated relatively thin strip of metallic material having equally spaced apart slots in communication with one edge thereof and a solid portion; a rotatable head having a relatively flat working face, a plurality of spaced apart inner pins reciprocably carried by said head, arranged in a circle and adapted to engage the strip slots; a plurality of outer pins reciprocably carried by said head outwardly of said inner pins and adapted to engage the other edge of the material, means for moving said pins and head together, means for reciprocating said pins from a retracted to an extended position with a portion of the pins projecting axially beyond said working face to drive and form the strip into a helix, means for urging the strip against said working face when said pins are in their extended positions, and means for varying the angular position at which said inner and outer pins are successively returned to their respective retracted position whereby said apparatus is capable of shaping strips of different compositions, thicknesses, and hardnesses, into arcuate forms without introducing objectionable stresses and deformations therein:

9. In an apparatus for forming a helically wound stator core from an elongated relatively thin strip of magnetic material having equally spaced apart slots in communication with one edge thereof and a solid portion; a rotatable head having a relatively flat working face; a plurality of spaced apart inner pins reciprocably carried by said head, arranged in a circle and adapted to engage the strip slots; a plurality of outer pins reciprocably carried by said head with an outer pin disposed in substantially radial alignment with a corresponding inner pin, a predetermined radial distance corresponding to the dimensional width of the solid strip portion, and adapted to engage the other edge of the material; means for rotating said pins and head as a unit; adjustable cam means for reciprocating said pins from a retracted to an extended position with a portion of the pins projecting axially beyond said working face to drive and form the strip into a helix; means for limiting the movement of said pins into said extended position, means for urging the strip against said working face when said pins are in their extended positions; and means for independently varying the angular position at which said inner and outer pins are successively returned to their respective retracted positions, whereby said apparatus is capable of shaping strips of different compositions, thicknesses, and hardnesses, into arcuate forms of substantially uniform thicknesses without introducing objectionable stresses and deformations therein.

10. A method for winding an elongated relatively thin strip of material, having a solid portion and inner and outer edges, edgewise around an axis into successive helical turns to form a helix comprising the steps: placing a series of movable forming elements successively into engagement with at least the outer edge of the strip, with inner forming means engaging the inner edge thereof; driving the strip through a confined arcuate path by conjoint angular movement of said elements and said forming means while in engagement with the strip, and concurrently applying a generally constant lateral compressive force to the sides of the strip solid portion as the strip travels through said confined path whereby the cooperation of said inner forming means and outer movable elements form a number of small bending moments on the strip to drive and to bend it into a helix.

11. In an apparatus for winding an elongated relatively thin strip of material having inner and outer edges edgewise around an axis into successive helical turns to form a helix, a rotatable driving head having a working face and mounting spaced apart inner and outer forming means arranged to engage the respective inner and outer edges of the strip, at least said outer forming means including a plurality of angularly spaced apart movable elements arranged to move between retracted and extended positions, means for moving at least each of said outer forming elements between said retracted and extended positions, said outer forming elements projecting beyond said working face into firm engagement with the outer edge of the strip when in said extended positions to form a number of small bending moments with said inner forming means, whereby upon rotation of said driving head, said inner and outer forming means cooperate to drive the strip in an arcuate path and to form the strip into a helix without introducing objectionable stresses therein.

References Cited in the file of this patent
UNITED STATES PATENTS

| | | |
|---|---|---|
| 1,920,154 | Carlson | July 25, 1933 |
| 1,970,536 | Mansur | Aug. 14, 1934 |
| 2,398,172 | Bruegger | Apr. 9, 1946 |
| 2,404,185 | Mann | July 16, 1946 |
| 2,471,777 | Reinartz | May 31, 1949 |
| 3,062,267 | Hart et al. | Nov. 6, 1962 |